United States Patent Office 3,057,643
Patented Oct. 9, 1962

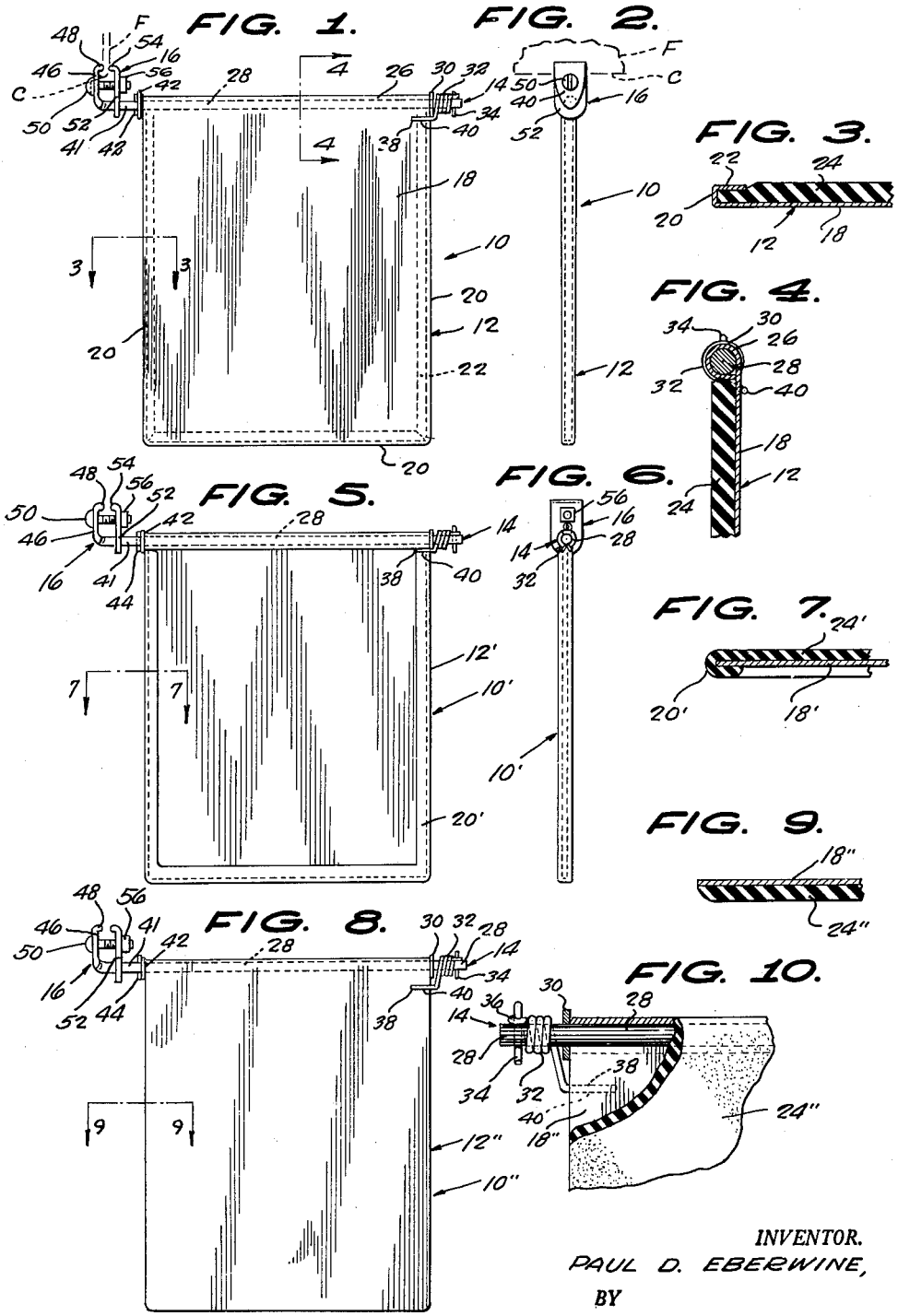
INVENTOR.
PAUL D. EBERWINE,
BY
ATTORNEY

3,057,643
SPLASH FLAP FOR VEHICLE FENDERS
Paul D. Eberwine, Columbus, Ohio. (Rte. 2, Corner of Belvedere and Dardydale, Mount Vernon, Ohio)
Filed Sept. 25, 1961, Ser. No. 140,529
7 Claims. (Cl. 280—154.5)

This invention relates generally to vehicle attachments or accessories and more particularly to a new and improved splash-flap or mud guard to be suspended from a vehicle fender behind a wheel.

During inclement weather, there is a danger of impairing the vision of the driver of a trailing vehicle when water, mud or snow are cast off the wheels of a leading vehicle. Additionally, pebbles are often picked up in a tire tread and thrown rearwardly. Further, trucks having dual wheels often pick up very large rocks between the dual tires and these rocks are cast rearwardly at a very high speed and this involves a considerable danger to a trailing vehicle.

A primary object of this invention is to provide a novel wheel or fender guard which is readily and economically manufactured, easily installed and maintained and highly practical and desirable for the purpose intended.

A further object of the invention is to provide a splash guard or flap which includes a novel body member, novel means for mounting the body member and novel clamp means for mounting the guard on a vehicle fender.

Other objects and advantages of the present invention will become apparent during the course of the following description.

In the drawings:

FIGURE 1 is a rear elevation of the novel fender guard, showing in phantom lines a fragmentary portion of the edge of a fender upon which the guard will be mounted;

FIGURE 2 is a side elevational view looking from left to right at FIGURE 1;

FIGURE 3 is an enlarged fragmentary sectional view taken substantially on line 3—3 of FIGURE 1;

FIGURE 4 is a fragmentary enlarged sectional view taken substantially on line 4—4 of FIGURE 1;

FIGURE 5 is a view similar to FIGURE 1, showing a modified body member;

FIGURE 6 is a view similar to FIGURE 2, looking from right to left at FIGURE 5;

FIGURE 7 is an enlarged fragmentary sectional view taken substantially on line 7—7 of FIGURE 5;

FIGURE 8 is a view similar to FIGURES 1 and 5 showing a further embodiment of body member;

FIGURE 9 is an enlarged fragmentary sectional view taken substantially on line 9—9 of FIGURE 8; and FIGURE 10 is an enlarged fragmentary view of the upper right hand corner of FIGURE 8, looking at the side opposite that shown in FIGURE 8.

Referring to the drawing, and first considering FIGURES 1–3, a splash guard is indicated generally at 10 and comprises a body member 12, support pin means 14 and clamp means 16.

The body member 12 in the disclosed embodiment comprises a rectangular panel including a metal sheet 18 of substantially the same gauge as that used in wheel fenders, for example. The sheet 18 includes at the peripheral side and lower edges a V-shaped reverse-bend portion 20 which clampingly engages the adjacent peripheral edges 22 of a resilient sheet 24 of rubber, plastic, etc.

The metal will face rearwardly and can have a reflective surface, be painted in different colors, etc.

The upper edge of the metal sheet 18 includes a reverse-bend forming an integral, transverse, tubular bearing 26 which has extending therethrough an elongated shaft 28 of the pin means 14. The pin means 14 includes on the end of the shaft which projects beyond one side of the body member, a washer element 30 engaged by a torsion spring 32 circumposed about the shaft and anchored to the shaft 28 by means of a transverse pin 34 about which the terminal end 36 of the spring extends. The spring 32 includes an end portion 38 extending parallel to the longitudinal axis of the shaft 28 in engagement at 40 with the rear surface of the body member 10.

The torsion spring will orient the body member 10 to a substantially vertical position and tend to retain it in this position during vehicle movement. However, the spring will permit some rotation of the body member on the shaft 28 during excessively high speed to accordingly prevent excessive fatigue and damage to the body member if the body member were rigidly mounted on the vehicle fender indicated at F.

The shaft 28 includes on the end 41 opposite the torsion spring 32 a washer 42 retained adjacent the edge of the body member 10 by a transverse pin 44. The end 41 terminates in an upwardly extending flattened portion 46 which includes an inwardly extending lip portion 48 engageable at one side of the fender edge e. The flattened portion 46 includes a transverse aperture therethrough which receives a headed bolt 50 comprising a portion of the clamp means 16.

Reciprocably supported on the shaft portion 41 is an apertured clamp element 52, which is disposed in opposed relation to the shaft portion 46, the clamp element 52 including a lip portion 54 engageable at the fender edge e opposite the lip portion 48. The clamp element 52 is transversely apertured and receives therethrough the threaded end of the bolt 50 upon which is engaged a nut element 56. The manner in which the clamp means 16 is effective is believed to be obvious, and thus, further explanation thereof does not appear to be necessary.

The resilient sheet is generally disposed in facing relation to the vehicle wheels and will serve to deaden sounds from pebbles being thrown rearwardly, for example. Further, the portion 46 of the shaft 28 as well as the clamp element 52 may be coated with a plastic or rubber material to prevent damage to the vehicle fender finish.

Considering the embodiment indicated at 10' in FIGURES 5–7, it will be noted that the pin means 14 and clamp means 16 are the same as those previously described. In this embodiment, the body member 12' comprises a resilient sheet 24' molded about a metal sheet, it being noted that the sheet 24' includes a grooved peripheral collar 20' at the side and bottom edges for gripping and retaining the sheet 18' in a fixed position.

Considering FIGURES 8–10, the embodiment indicated at 10" includes pin means 14 and clamp means 16 similar to that previously described. The body member 12" in this embodiment comprises a metal sheet 18" which has sprayed or painted thereon a layer or sheet of resilient material 24".

It is to be understood that the invention herewith disclosed and described is to be considered a preferred example of the same, that various changes within the spirit of the invention will be apparent to those skilled in the art, and the invention is to be limited only as defined by the scope of the subjoined claims.

I claim:

1. A splash-flap for vehicle fenders comprising a planar body member, said body member comprising juxtaposed sheets of metal and a resilient material, bearing means at one edge of said body member, support pin means in said bearing means, and clamp means on said support pin for mounting said body member on the edge of a vehicle fender rearwardly of a vehicle wheel, said clamp means comprising an end portion of said support pin means disposed angularly to the longitudinal axis of said support pin, a clamp element reciprocably supported on said support pin means in confronting relation to said angularly disposed end portion of said support pin means, and adjustable fastener means extending transversely through said clamp element and angularly disposed end portion of said support pin means for adjusting the clamp element with respect to angularly disposed end portions of said support pin.

2. The structure of claim 1; said bearing means comprising an integral, continuous, single tubular channel transversely of the upper edge of the metal sheet and above the adjacent upper edge of the sheet of resilient material of said body member.

3. The structure of claim 1; and spring means engaged between said support pin means and body member and maintaining said body member in an oriented position with respect to said support pin.

4. The structure of claim 3; said spring means comprising a torsion spring circumposed about said support pin means, said spring being anchored on said support pin means and including one end extending parallel to said support pin means and abuttingly engaged with one side of said body member.

5. The structure of claim 1; said metal sheet including reverse bend peripheral edge portions clampingly engaging adjacent peripheral edge portions of said resilient sheet.

6. The structure of claim 1; said resilient sheet including a peripheral margin molded in overlying relation to one of the adjacent peripheral edge portions of said metal sheet.

7. A splash-flap for vehicle fenders comprising a planar body member, bearing means at one edge of said body member, support pin means in said bearing means, and clamp means on said support pin for mounting said body member on the edge of a vehicle fender rearwardly of a vehicle wheel, said clamp means comprising an end portion of said support pin means disposed angularly to the longitudinal axis of said support pin, a clamp element reciprocably supported on said support pin means in confronting relation to said angularly disposed end portion of said support pin means, and adjustable fastener means extending transversely through said clamp element and angularly disposed end portion of said support pin means for adjusting the clamp element with respect to angularly disposed end portions of said support pin.

References Cited in the file of this patent

UNITED STATES PATENTS

| | | |
|---|---|---|
| 1,807,039 | Keizer | May 26, 1931 |
| 2,414,676 | Taurman et al. | Jan. 21, 1947 |
| 2,591,196 | Post | Apr. 1, 1952 |
| 2,593,179 | Price et al. | Apr. 15, 1952 |
| 2,970,849 | Betts | Feb. 7, 1961 |